May 29, 1923.
E. J. DELBRIDGE
HITCHING AND TETHERING DEVICE
Filed Nov. 15, 1922
1,456,627
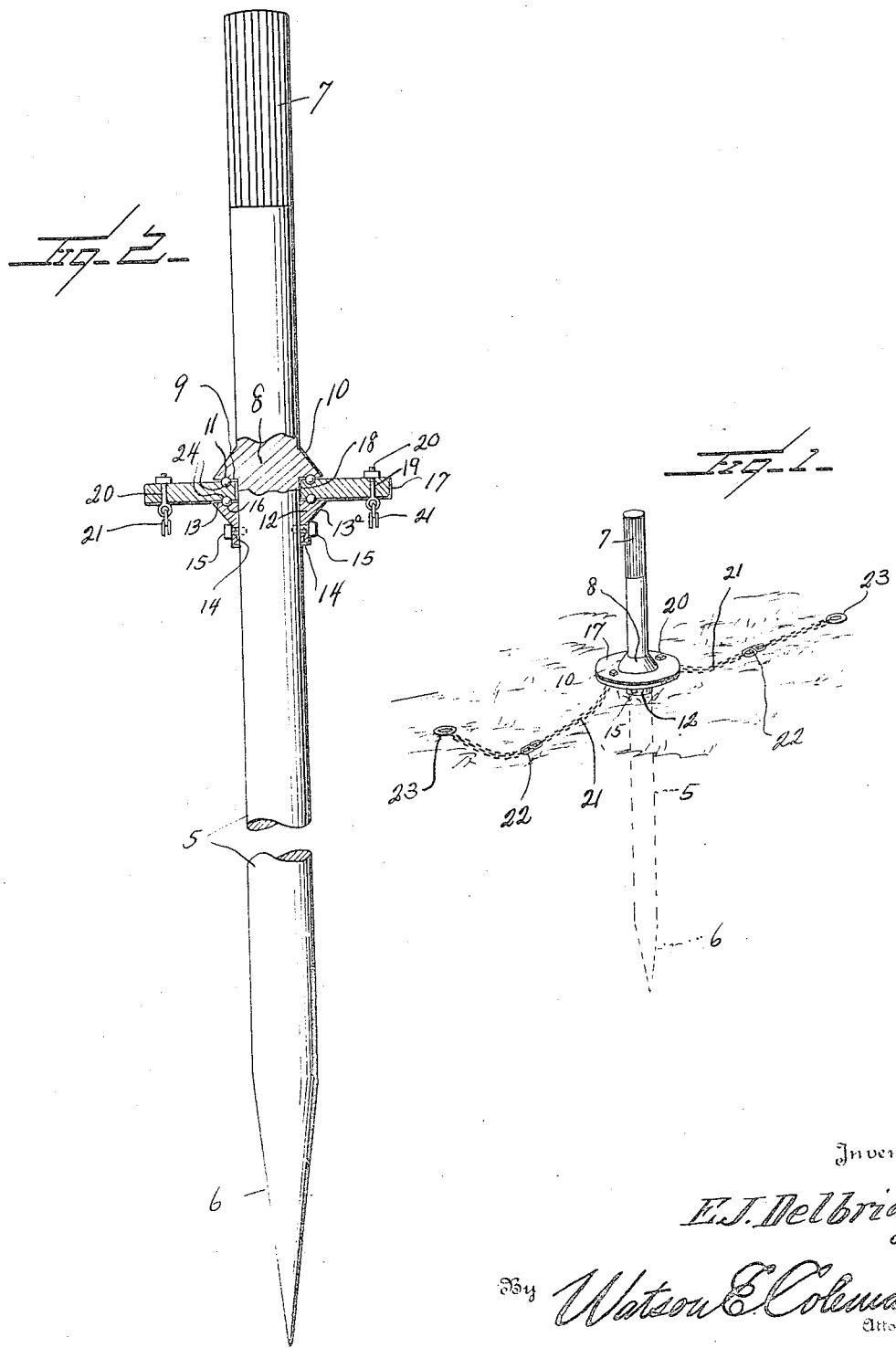
Inventor
E. J. Delbridge
By Watson E. Coleman
Attorney Patented May 29, 1923.

1,456,627

UNITED STATES PATENT OFFICE.

EDWARD JOHN DELBRIDGE, OF HATCH, IDAHO.

HITCHING AND TETHERING DEVICE.

Application filed November 15, 1922. Serial No. 601,111.

*To all whom it may concern:*

Be it known that I, EDWARD J. DELBRIDGE, a citizen of the United States, residing at Hatch, in the county of Bannock and State of Idaho, have invented certain new and useful Improvements in Hitching and Tethering Devices, of which the following is a specification, reference being had to the accompanying drawings.

This invention relates to tethering and hitching devices, and has for its object to provide a device of this character capable of being readily inserted in the ground at any point desired and wherein it is possible to hitch the animal to the device without danger of the tie rope becoming entangled.

It is a further object of the invention to provide a device of this character having a holding member which is movable without any unnecessary effort on the part of the animal and without causing wear on the body portion of the device.

It is a further object of the invention to provide a device of this character including supporting means, a portion of which is adjustable and removable to permit the holding means to be replaced when necessary, thus eliminating the necessity of discarding the entire device should the holding means become damaged.

It is still a further object of the invention to provide a device of this character wherein the supporting and holding means are disposed a considerable distance from the end portion of the body portion of the device intended to receive blows when the device is inserted in the ground.

With these and other objects in view, the invention consists in the improved construction and arrangement of parts to be hereinafter more particularly described, fully claimed and illustrated in the accompanying drawings, in which:—

Figure 1 is a perspective view of a hitching and tethering device constructed in accordance with an embodiment of the invention; and Figure 2 is an enlarged elevation partly in section showing the mounting of the holding member.

Referring to the drawings, 5 designates the body member or stake which may be made in any length and diameter desired. The lower end portion 6 of the body member is tapered to facilitate insertion of the device in the ground. The upper end portion 7 is milled to permit the operator to readily hold the device, while the same is being inserted in the ground.

Carried by the upper portion of the body member 5 is a supporting member 8, said supporting member being in the form of an annular flange having its lower face 9 disposed at right angles to the stake while its upper face 10 is inclined downwardly to reinforce the supporting member. The lower face 9 is provided with a centrally annularly extending groove 11 for a purpose to be hereinafter more particularly described.

In connection with the supporting member 8, a second supporting member 12 is provided. This member is substantially in the form of a collar having its upper face 13 disposed at right angles to the stake, while its outer face $13^a$ inclines downwardly to reinforce the collar. The lower end portion 14 of the collar is provided with a plurality of set screws 15 adapted to extend through the collar and into engagement with the stake 5 to hold the collar in various adjusted positions. The upper face 13 of the collar, similar to the supporting member 8, is provided with a groove 16 which substantially registers with the groove 11.

In order to permit universal movement of the animal attached to the device there is provided a novel holding member 17 in the form of a plate having a central opening 18 for the reception of the stake 5. The outer edges of the plate are provided with openings 19 for the reception of bolts 20 to which connecting chains 21 are connected. Each of the chains 21 is provided with a swivel 22 at its central portion and a connecting ring 23 at its outer end portion. The upper and lower faces of the holding member 17, adjacent the central opening thereof, is provided with annular grooves 24.

In assembling the device the stake is reverted so as to permit the placing of ball bearings in the groove 11 of the supporting member 8. The holding member 17 is then moved longitudinally of the stake until the ball bearings disposed in the groove 11 also enter the upper groove 24 of the holding member. Additional ball bearings are then placed in the lower groove 24 of the supporting member 17 and the second supporting member or collar 12 extended longitudinally of the stake toward the holding member 17, the second mentioned series of ball bearings being positioned to enter the groove 16 of the collar.

The set screws 15 may then be tightened so as to hold the collar in proper relation with respect to the holding member 8 and to permit rotary movement of the holding member 17.

In the application of the device the stake may be put at any point desired, and in view of the novel rotatable holding member, is adapted for all purposes, for instance, hitching or tethering purposes. When the stake is being driven into the ground there is no danger of the supporting members or holding members becoming injured or tightened, in view of the fact that these members are disposed a considerable distance from the upper end of the stake. They are disposed adjacent the central portion of the stake, so that regardless of the number of times the device is used and the flange which will be probably formed at the top of the stake due to the blows received thereby, there is no possibility of the supporting members and holding members being interfered with. In addition to this, by the particular position of the supporting members and holding member, a considerable portion of the stake is left projecting from the ground which permits the operator to readily grasp the same in case it is desired to remove the stake to another place.

From the foregoing it will be readily seen that this invention provides a novel form of hitching and tethering device capable of being readily inserted in the ground and used as a universal stake. All of these features are possessed by a device which is compact and simple in construction.

What is claimed is:—

A hitching and tethering device comprising a standard having a flange formed integrally therewith adjacent one end of the standard and projecting outwardly, said flange surrounding the standard and having its lower face disposed at right angles to the standard to provide a bearing surface, a holding plate having a central opening adapted to receive the standard and engage the bearing face of the flange, the plate being rotatable on the standard, the edge portion of the plate projecting beyond the flange, hitching means carried by said edge portion at spaced intervals, a collar movably mounted on the standard, the upper face of said collar being disposed at right angles to the standard to provide a bearing face adapted to engage the plate, and a plurality of threaded openings provided in the collar adjacent its lower edge for the reception of set screws whereby the bearing collar may be urged into binding engagement with the plate and the plate urged into binding engagement with the flange and the set screws tightened to hold the plate rigid.

In testimony whereof I hereunto affix my signature.

EDWARD JOHN DELBRIDGE.